United States Patent [19]
Goettsche

[11] Patent Number: 5,535,297
[45] Date of Patent: Jul. 9, 1996

[54] MICRO-ALIGNMENT METHOD

[75] Inventor: Randy P. Goettsche, Phoenix, Ariz.

[73] Assignee: Honeywell Inc., Minneapolis, Minn.

[21] Appl. No.: 168,831

[22] Filed: Dec. 16, 1993

[51] Int. Cl.⁶ .................................................. G02B 6/42
[52] U.S. Cl. ................................. 385/90; 385/91; 385/92; 385/93
[58] Field of Search ........................... 385/33, 88, 90–94

[56] References Cited

U.S. PATENT DOCUMENTS

| | | | |
|---|---|---|---|
| 4,435,037 | 3/1984 | Abramson et al. | 385/90 |
| 4,720,163 | 1/1988 | Goodwin et al. | 385/90 |
| 4,874,217 | 10/1989 | Janssen | 385/91 |
| 4,884,015 | 11/1989 | Sugimoto et al. | 318/640 |
| 5,029,965 | 7/1991 | Tan | 385/90 |

*Primary Examiner*—Frank Gonzalez
*Attorney, Agent, or Firm*—John G. Shudy, Jr.

[57] ABSTRACT

A light coupler comprises a light source and a light conductor coupled together by a housing. The housing is permanently deformed to increase light coupling between the light source and the light conductor.

24 Claims, 4 Drawing Sheets

MICRO-ALIGNMENT METHOD

TECHNICAL FIELD OF THE INVENTION

The present invention relates to the alignment of a light source and a light receiver, and more particularly to the alignment of a light conductor and a light emitting diode so as to increase light coupling therebetween.

BACKGROUND OF THE INVENTION

Light sources, such as light emitting diodes and the like, and light conductors, such as optical fibers and waveguides, are used in a variety of applications. For example, in a fiber optic rotation sensor, which is arranged to sense rotation about an axis, an optical fiber is looped into a coil. Such a fiber optic rotation sensor ordinarily comprises an interferometer which includes a light source, a beam splitter, a detector, and a light path. The light path is provided by the coil, and the fiber optic rotation sensor is mounted on a rotatable platform. Light from the light source is conducted, usually by an optical fiber, to the beam splitter where the light is split into two beams which are directed to opposite ends of the light path and which then counterpropagate around that path. The light beams exit the light path, the light beams are recombined, and the resulting combined light beam is sensed by a detector. A sensing circuit connected to the detector determines any phase difference between the counterpropagating light beams.

Assuming that this fiber optic rotation sensor experiences no rotation, ideally no difference in phase between the counterpropagating light beams will be detected. On the other hand, if the sensor experiences rotation, there will be a phase difference between the counterpropagating light beams which can be detected to indicate the extent and direction of rotation.

Typically, a light emitting diode is provided as the source of light. The light emitting diode is coupled by a corresponding light coupler to the optical fiber which conducts the light emanating from the light emitting diode to the beam splitter. The light coupler is designed to ensure that light from the light emitting diode is coupled to the optical fiber with a high coupling ratio. The coupling ratio of a light coupler is determined by dividing the light received by the optical fiber by the light emanating from the light emitting diode. A light coupler having a high coupling ratio minimizes the coupling loss between the light emitting diode and the optical fiber.

A typical light coupler includes a housing for mounting the light emitting diode, a lens, and an end of the optical fiber together in such a fashion that the lens focuses light from the light emitting diode onto the end of the optical fiber. In order for a light coupler to achieve a high coupling ratio, the optical fiber must be precisely positioned at the focal point of the light emanating from the light emitting diode and focused by the lens.

In this type of light coupler, the diameter of the focus of the light emanating from the light emitting diode and the diameter of the core of the optical fiber typically are each approximately 0.0002 inch. With these dimensions, a 0.00002 inch ($20 \times 10^{-6}$ inch) positioning error between the focus of the light emanating from the light emitting diode and the core of the optical fiber can cause a 10% loss in the coupled power.

Prior art methods of aligning the focus of the light emanating from a light emitting diode and the core of the optical fiber have been able to routinely accomplish alignment within a 0.00002 inch tolerance or better. Once aligned, the light emitting diode, the lens, and the light receiving end of the optical fiber are secured in an effort to achieve alignment stability, i.e. to maintain this alignment during assembly and over the operating conditions typically experienced by the light coupler. Many methods are known to secure the diode/lens/fiber assembly once alignment has been achieved. These methods typically rely upon a securing means such as a weld, solder, or a bonding agent (e.g. an adhesive) in order to attempt to achieve alignment stability.

However, such prior art securing means for securing the diode/lens/fiber assembly have not resulted in alignment stability. A strong and stiff securing means causes the assembly to shift as the securing means cures, and adjustment of the assembly once the strong and stiff securing means cures induces alignment instability and/or is uncontrollable. A weaker securing means cannot maintain alignment stability over time and environmental changes. Thus, even though prior art alignment methods have been able to achieve an adequate initial alignment, these alignment methods have been unable to maintain alignment stability.

SUMMARY OF THE INVENTION

The present invention solves these problems by providing an apparatus and a method wherein, after a light coupler has been aligned and secured, the optical fiber may be moved relative to the focus of the light from the light emitting diode in such a way that (i) micro-inch motions are achievable and controllable in order to align the light receiving end of the optical fiber with the focus of light, (ii) the alignment, once achieved, is permanent and substantially unaffected by temperature or by temperature cycling over a wide range (for example $-55°$ C. to $+100°$ C.), and (iii) polarization of the light is substantially unaffected.

Therefore, according to one aspect of the invention, an apparatus comprises a light supplying means for supplying light, a light receiving means for receiving light from the light supplying means, and a coupling means for coupling the light supplying means and the light receiving means in an alignment so that the light receiving means receives light from the light supplying means. The coupling means has a localized plastic deformation so as to permanently align the light supplying means and the light receiving means.

According to another aspect of the invention, an apparatus includes a light supplying means for supplying light, a light receiving means coupled to the light supplying means for receiving light from the light supplying means, and a deforming means for deforming the light receiving means with a localized plastic deformation so as to increase light coupling between the light supplying means and the light receiving means.

According to yet another aspect of the present invention, a method of providing a light coupler with a localized plastic deformation so as to increase light coupling between a light source and a light conductor comprises the steps of (a) applying a sharpened blade to a localized area of the housing of the light conductor in order to control alignment between the light source and the light conductor so as to increase light coupling between the light source and the light conductor, (b) observing the amount of light received by the light conductor, (c) reapplying the sharpened blade to a localized area of the light coupler if an increase in the amount of light received by the light conductor is observed in step (b), and (d) repeating steps (b) and (c) until the observed amount of light received by the light conductor does not increase.

According to yet a further aspect of the present invention, an apparatus includes a light supplying means for supplying light, a light receiving means coupled to the light supplying means for receiving light from the light supplying means, and a deforming means for deforming the light receiving means with a localized plastic deformation so as to change light coupling between the light supplying means and the light receiving means.

BRIEF DESCRIPTIONS OF THE DRAWING

These and other features and advantages will become more apparent from a detailed consideration of the invention when taken in conjunction with the drawing in which.

DETAILED DESCRIPTION

Figure 1:
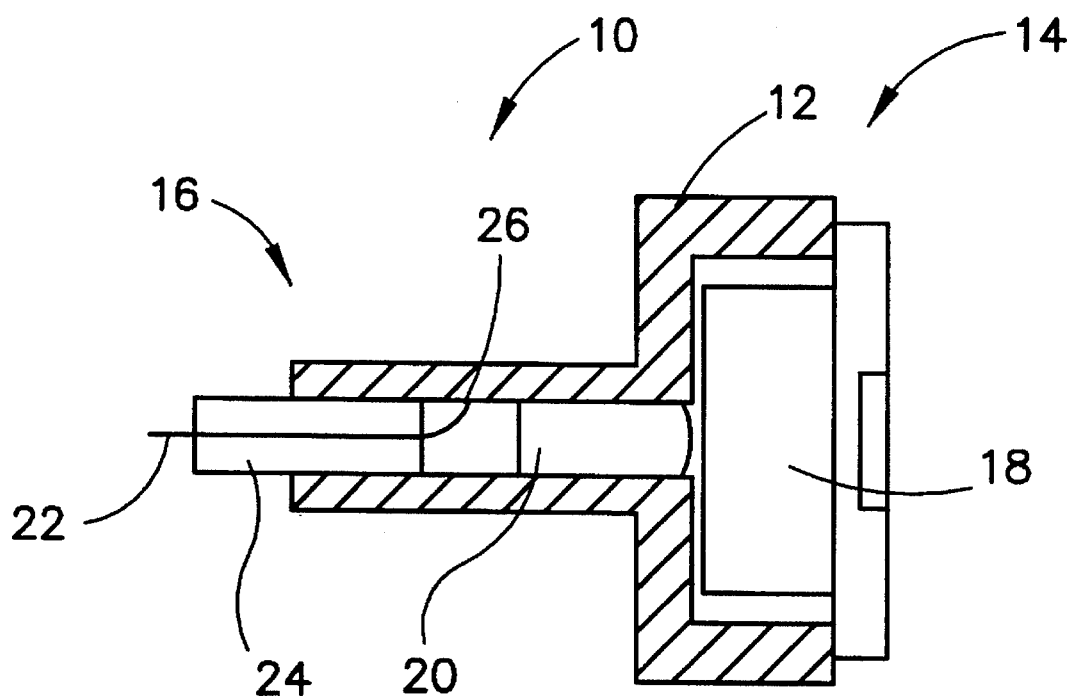
FIG. 1 is a partial cross-sectional view of a housing for a light emitting diode, a lens, and an optical fiber.

As shown in FIG. 1, the light coupler 10 according to the present invention includes a housing 12 having a first end 14 and a second end 16. The housing 12 may be Carpenter Kovar® supplied by Carpenter Technology Corp., or any other similarly stable material. Within the first end 14 of the housing 12 is a light source 18, such as a light emitting diode. Within the second end 16 of the housing 12 is a lens 20 which receives light from the light source 18. Also within the second end 16 of the housing 12 is an optical fiber 22 surrounded by a glass ferrule 24. The lens 20 focuses the light from the light source 18 onto an end 26 of the optical fiber 22. The glass ferrule 24 holds the optical fiber 22 within the second end 16 of the housing 12 so that the optical fiber 22 receives light from the lens 20.

Epoxy may be used to bind the light source 18 to the first end 14 of the housing 12 and to bind the lens 20 and the glass ferrule 24 to the second end 16 of the housing 12. Before the epoxy sets, the positions of the glass ferrule 24 and the light source 18 may be adjusted until the end 26 of the optical fiber 22 is positioned at the focus of the light exiting from the lens 20. A light sensor, electrical power to the light source 18, and a suitable display (none of which are shown in FIG. 1) may be provided in combination with the light source 18 and the optical fiber 22 in order to detect the intensity of the light being received by the optical fiber 22 from the lens 20 during positioning of the glass ferrule 24 and the light source 18. In this manner, the positions of the glass ferrule 24 and the light source 18 within the housing 12 may be adjusted until maximum intensity of the light received by the optical fiber 22 is achieved. Once the end 26 has been properly aligned with respect to the focus of the light exiting from the lens 20, the positions of the glass ferrule 24, the lens 20, and the light source 18 may be held until the epoxy sets to permanently bind the glass ferrule 24, the lens 20, and the light source 18 to the housing 12.

As mentioned heretofore, bonding agents such as epoxy, can allow the initial alignment between the optical fiber 22 and the focus of the light from the light source 18 to shift as the bonding agent cures. However, by permanently deforming the second end 16 of the housing 12, proper alignment between the optical fiber 22 and the focus of the light from the light source 18 can be reestablished and will be stable over time and environmental (e.g., temperature) changes.

Before the second end 16 of the housing 12 is deformed with a localized plastic deformation, however, the light coupler 10 should preferably be exposed to at least three temperature cycles. The maximum and minimum temperatures of these temperature cycles should preferably be equal to, or greater than, the temperature extremes to which the light coupler 10 will likely be exposed during the operation and the storage thereof. Then, the second end 16 of the housing 12 may be deformed with a localized plastic deformation in order to realign the end 26 of the optical fiber 22 to the focus of the light from the lens 20.

Figure 2:
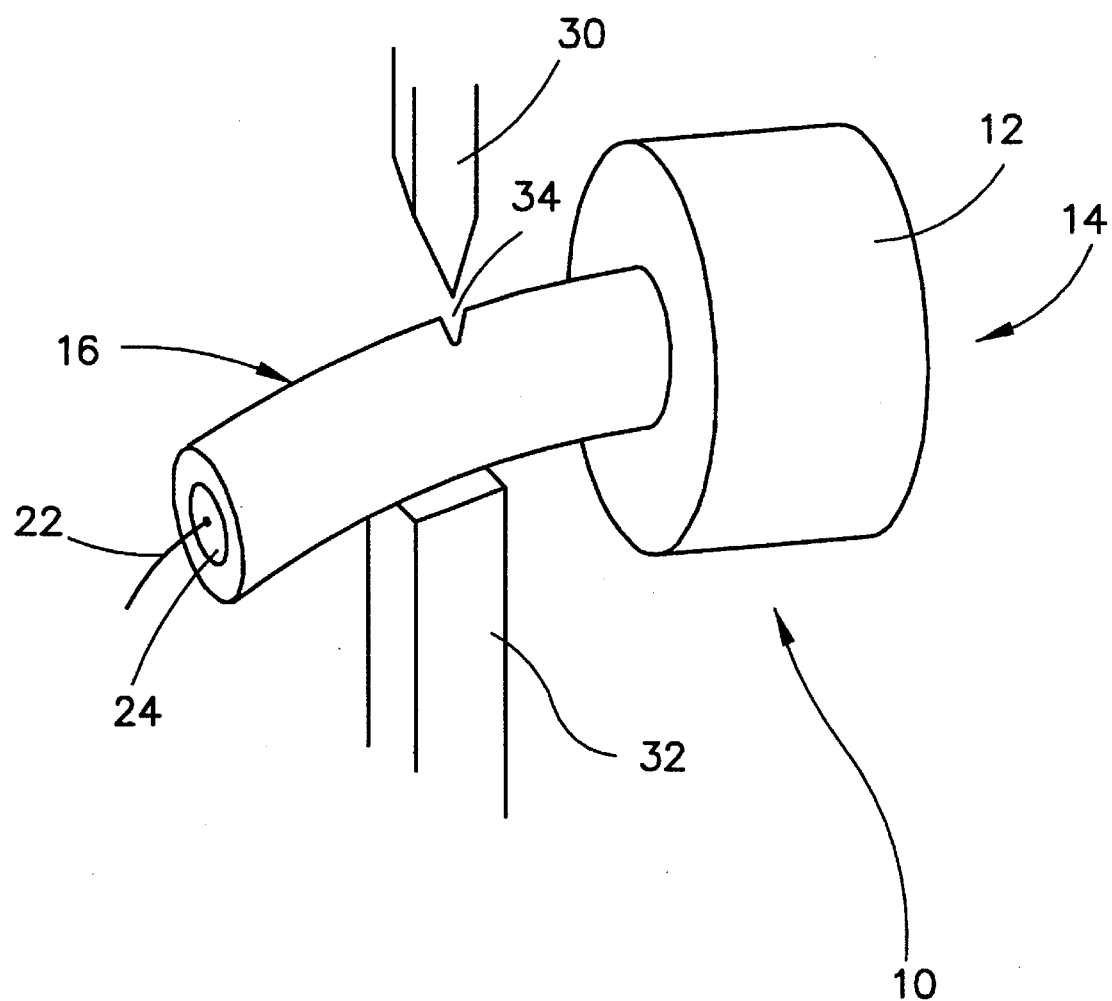
FIG. 2 shows the housing having a localized plastic deformation which effects alignment between the lens and the optical fiber shown in FIG. 1; and, FIGS. 3 and 4 show an apparatus for controlling the localized plastic deformation of the housing of FIG. 1.

As shown in FIG. 2, this localized plastic deformation may be provided by a sharpened blade 30 which is applied against the second end 16 of the housing 12. A ram stop 32 may also be provided to rigidly support the second end 16 of the housing 12 while pressure is being applied by the sharpened blade 30 against the second end 16 during deformation. The change in the amount of light coupled to, and transmitted by, the optical fiber 22 may be observed by use of an optometer during the process of deforming the second end 16 of the housing 12. By observing this change in the amount of light, maximum light coupling may be ensured as the end 26 of the optical fiber 22 is aligned to the focus of the light from the lens 20. Thus, as long as the optometer reading increases, the deforming process is continued. On the other hand, when the light intensity of the light conducted through the optical fiber 22 no longer increases, the deforming process is discontinued.

As a result of the deforming process, the sharpened blade 30 provides a localized plastic deformation 34 (which may be in the form of a nick) in the second end 16 of the housing 12 of the light coupler 10. The localized plastic deformation 34 is exaggerated in FIG. 2 for explanatory purposes, and may be quite small. The localized plastic deformation 34 of the second end 16 of the housing 12 achieves the desired alignment between the end 26 of the optical fiber 22 and the focus of the light from the lens 20. The resulting alignment is stable over time and environmental changes.

Figure 3:
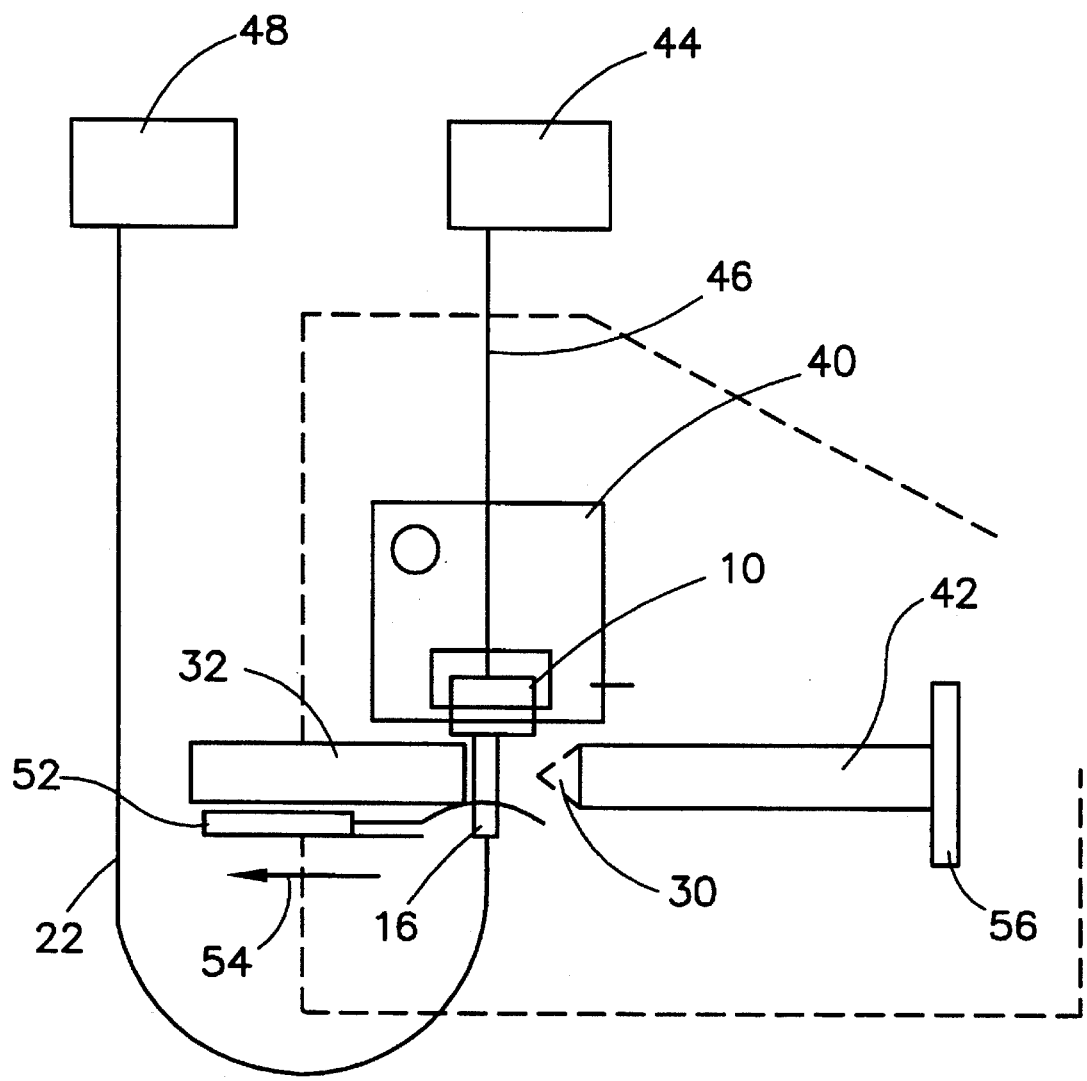

Shown in FIG. 3 is a schematic diagram of an alignment system which controls the sharpened blade 30 in order to align the end 26 of the optical fiber 22 with the focus of the light from the lens 20. As shown in FIG. 3, the light coupler 10 is inserted into a housing chuck 40. The housing chuck 40 holds the light coupler 10 between the ram stop 32 and the sharpened blade 30 positioned at the end of a ram 42. The position of the housing chuck 40 may be adjusted until the second end 16 of the light coupler 10 is positioned against the ram stop 32 between the ram stop 32 and the sharpened blade 30 at the end of the ram 42. When the desired position of the housing chuck 40 has been achieved, the housing chuck 40 may be clamped into this position by a suitable clamp (not shown).

A power supply 44 is coupled by a conductor 46 to the light source 18 of the light coupler 10. The optical fiber 22 emerging from the light coupler 10 is coupled to an optometer 48 so that the intensity of the light received from the lens 20 by the end 26 of the optical fiber 22 can be observed.

In a preferred method of permanently aligning the end 26 of the optical fiber 22 with the focus of light from the lens 20, the ram 42 and the housing chuck 40 are first retracted. As discussed above, a light coupler 10 is inserted into the housing chuck 40, and the housing chuck 40 is moved until the second end 16 of the light coupler 10 is positioned against the ram stop 32 so that the second end 16 is between the ram stop 32 and the sharpened blade 30 at the end of the ram 42. This position may be maintained by suitable clamping of the housing chuck 40.

The sharpened blade 30 is then driven by the ram 42 until the sharpened blade 30 lightly touches the second end 16 at a point near the first end 14 of the housing 12. A delicate pressure, in the direction of an arrow 54, is then applied by way of a probe 52 to the second end 16 at a point away from the first end 14 of the housing 12. The probe 52 may be, for example, in the form of a dental probe. As pressure is applied to the second end 16 of the housing 12 by the probe 52, the optometer 48 may be observed in order to detect an increase in the light received by the optical fiber 22 from the lens 20. If the received light decreases or does not change, however, the light coupler 10 may be rotated within the housing chuck 40 by 5° to 10°, and pressure in the direction of the arrow 54 may again be applied to the second end 16 by the probe 52. This procedure is continued until an increase in the light received by the optical fiber 22 from the lens 20 as sensed by the optometer 48 is detected. Alternatively, instead of continuing this procedure until an increase in the light received by the optical fiber 22 from the lens 20 is detected, this procedure can be applied entirely around the circumference of the second end 16 in order to find the most sensitive deformation direction, i.e. the direction of applied pressure which produces the greatest increase of light.

When an increase of light is detected (or, the most sensitive deformation direction is determined), the sharpened blade 30 is driven by the ram 42, as by use of a knob 56, to apply increased pressure against the second end 16. After this increased pressure is applied, the pressure is released and the optometer 48 is observed in order to determine whether the intensity of the light received by the optical fiber 22 from the lens 20 has increased. If an increase in intensity is observed, the sharpened blade 30 is reapplied and again released. The optometer 48 is again observed in order to determine whether the intensity of the light received by the optical fiber 22 from the lens 20 has further increased. If so, this procedure is repeated until no further increase in light intensity is detected. Accordingly, the second end 16 of the housing 12 is deformed with the localized plastic deformation 34.

Thereafter, the housing 12 of the light coupler 10 is rotated 5° to 10°. The sharpened blade 30 is then driven by the ram 42 until the sharpened blade 30 lightly touches the second end 16 at a point near the first end 14 of the housing 12. A delicate pressure, in the direction of the arrow 54, is applied by the probe 52 to the second end 16 at a point away from the first end 14 of the housing 12. As pressure is applied to the second end 16 of the housing 12 by the probe 52, the optometer 48 may be observed in order to detect an increase in the light received by the optical fiber 22 from the lens 20. If the received light decreases or does not change, however, the light coupler 10 may be rotated within the housing chuck 40 by an additional 5° to 10°, and pressure in the direction of the arrow 54 may again be applied to the second end 16 by the probe 52. This procedure is continued until an increase in the light received by the optical fiber 22 from the lens 20 as sensed by the optometer 48 is detected. (Alternatively, the most sensitive deformation direction may be determined.) If an increase in light is so detected (or, the most sensitive deformation direction is so determined), the sharpened blade 30 is operated to again deform the second end 16 of the housing 12. In this manner, the rotation of the housing 12 of the light coupler 10 and the application and reapplication of pressure by the sharpened blade 30 against the second end 16 of the housing 12 are repeated until a desired light intensity, as sensed by the optometer 48, is achieved. This procedure may result in the deformation of the second end 16 of the housing 12 with more than one localized plastic deformation 34.

Accordingly, the second end 16 of the housing 12 is permanently deformed to achieve maximum coupling between the end 26 of the optical fiber 22 and the focus of the light from the lens 20. This alignment is secure in spite of the passage of time and the cycling of temperature.

Figure 4:
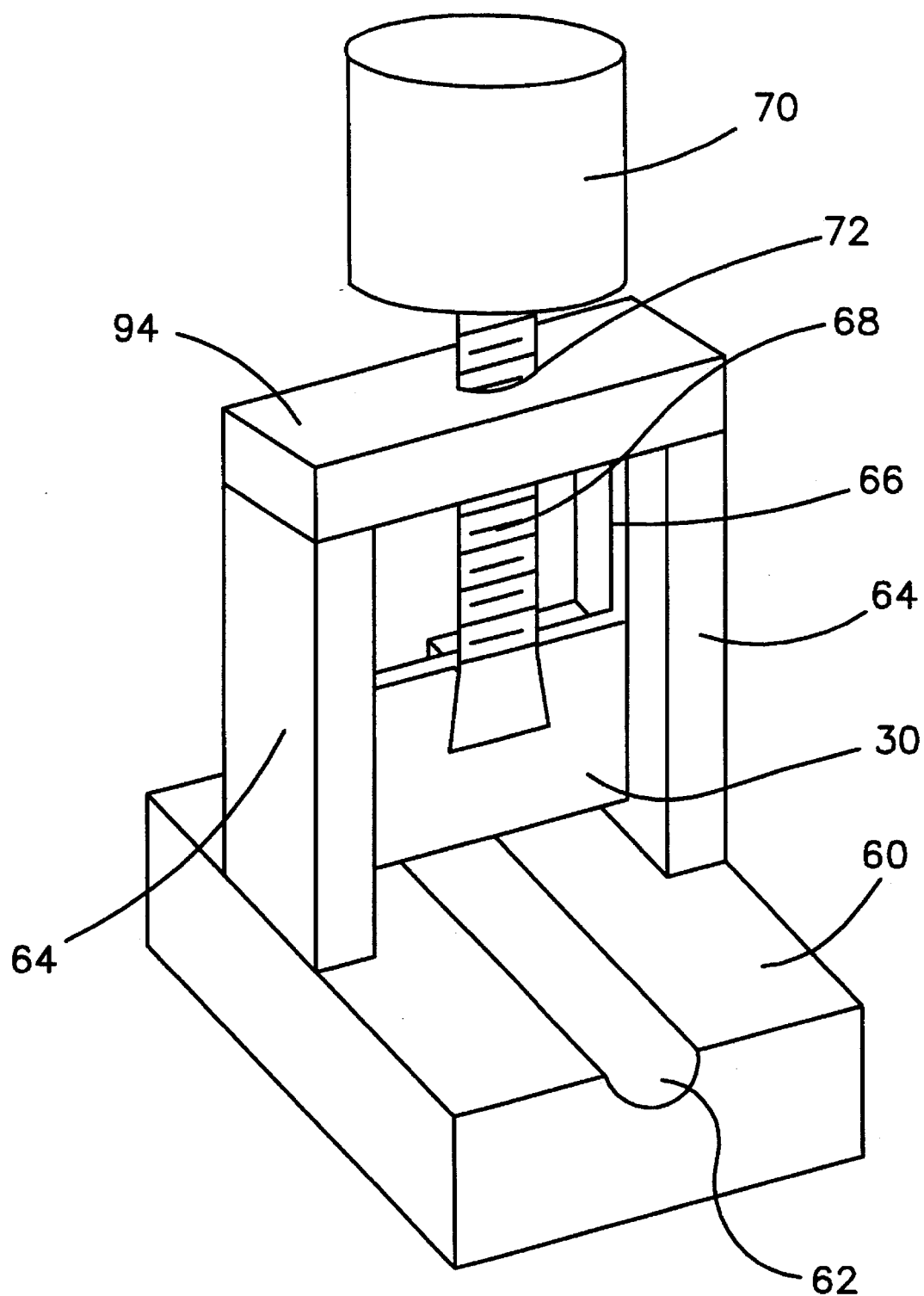

FIG. 4 shows a guillotine type of an arrangement for manually driving the sharpened blade 30 so as to apply pressure to the second end 16 of the housing 12. This arrangement has a base 60 which forms the ram stop 32. The base 60 has a semi-circular groove 62 having radii substantially equal to the radii of the tubular ends 14 and 16 of the housing 12. Accordingly, the semi-circular groove 62 snugly accommodates the housing 12. A pair of vertical blade guides 64 are provided each having a track 66 within which respective ends of the sharpened blade 30 slide. The sharpened blade 30 is positioned toward and away from the semi-circular groove 62 by a ram in the form of a threaded ram 68. The threads of the threaded ram 68 engage an internally threaded hole 72 of a top plate 74 which spans the vertical blade guides 64. A knurled knob 70 is provided for rotating the threaded ram 68 so that the threads of the internally threaded hole 72 and of the threaded ram 68 convert the rotary motion provided by the knurled knob 70 into linear motion for driving the sharpened blade 30 toward and away from the second end 16 of the housing 12 when the second end 16 is positioned within the semi-circular groove 62 of the base 60.

It will be apparent to those skilled in the art that modifications to the disclosed apparatus can be made without departing from the scope of the present invention. For instance, although the present invention has been described herein in relation to increasing the light coupling between a light source and a light receiver, it should be apparent that the present invention can be used to change the coupling to any desired amount. For example, it may be desirable to change the light coupling to some amount other than a peak amount. Other modifications should be apparent to those skilled in the art.

I claim:

1. An apparatus comprising:

light supplying means for supplying light;

light receiving means for receiving light from the light supplying means; and, coupling means for coupling the light supplying means and the light receiving means in an alignment so that the light receiving means receives light from the light supplying means, the coupling means being deformed by a nick so as to align the light supplying means and the light receiving means.

2. The apparatus of claim 1 wherein the light receiving means comprises an optical fiber, wherein the coupling means comprises a housing, and wherein the housing is permanently deformed by the nick so as to achieve increased light coupling between the light supplying means and the optical fiber.

3. The apparatus of claim 2 wherein the light supplying means comprises a light source and a lens arranged so that the lens focuses light from the light source onto the optical fiber.

4. The apparatus of claim 3 wherein the light source comprises a light emitting diode.

5. The apparatus of claim 4 wherein the housing also houses the light emitting diode and the lens.

6. The apparatus of claim 5 wherein the light receiving means comprises a glass ferrule surrounding the optical fiber, and wherein the housing surrounds the glass ferrule.

7. The apparatus of claim 6 wherein the glass ferrule, the lens, and the light emitting diode are epoxied to the housing.

8. An apparatus comprising:

light supplying means for supplying light;

light receiving means coupled to the light supplying means for receiving light from the light supplying means; and, deforming means for deforming the light receiving means with a localized cut so as to permanently change light coupling between the light supplying means and the light receiving means.

9. The apparatus of claim 8 wherein the deforming means comprises displaying means for displaying the amount of light received by the light receiving means from the light supplying means during deforming.

10. The apparatus of claim 9 wherein the deforming means comprises a blade and blade positioning means for positioning the blade so as to deform the light receiving means with the localized cut.

11. The apparatus of claim 8 wherein the light receiving means comprises an optical fiber and a housing for the optical fiber, and wherein the housing is deformed by the deforming means to form the localized cut of the housing so as to permanently increase light coupling between the light supplying means and the optical fiber.

12. The apparatus of claim 11 wherein the deforming means comprises displaying means for displaying the amount of light received by the optical fiber from the light supplying means.

13. The apparatus of claimed 12 wherein the deforming means comprises a blade and blade positioning means for positioning the blade so as to form the localized cut of the housing.

14. The apparatus of claim 8 wherein the light supplying means comprises a light emitting diode, and wherein the light receiving means comprises an optical fiber, a lens, and a housing for housing the light emitting diode, the lens, and an end of the optical fiber so that the lens focuses light from the light emitting diode onto the optical fiber.

15. The apparatus of claim 14 wherein the deforming means comprises displaying means for displaying the amount of light received by the optical fiber from the lens.

16. A method of providing a light coupler with a localized plastic deformation so as to increase light coupling between a light source and a light conductor comprising the following steps:

(a) applying a sharpened blade to a localized area of the housing of the light conductor in order to control alignment between the light source and the light conductor so as to increase light coupling between the light source and the light conductor;

(b) observing the amount of light received by the light conductor;

(c) reapplying the sharpened blade to a localized area of the light coupler if an increase in the amount of light received by the light conductor is observed in step (b); and, (d) repeating steps (b) and (c) until the observed amount of light received by the light conductor does not increase.

17. A method of aligning a light source and a light conductor comprising the following steps:

(a) contacting a housing with a device; and, (b) applying a pressure on the device in order to nick the housing to thereby permanently alter alignment between the light source and the light conductor.

18. The method of claim 17 wherein step (b) comprises the following step:

(c) observing the amount of light received by the light conductor as pressure is applied on the device.

19. The method of claim 18 wherein step (b) comprises the further following steps:

(d) removing the device from contact with the housing;

(e) re-contacting the housing with the device; and, (f) reapplying a pressure on the device in order to again nick the housing to thereby permanently re-alter alignment between the light source and the light conductor.

20. The method of claim 19 wherein step (b) comprises the further following step:

(g) repeating steps (c) through (f) until the observed amount of light received by the light conductor is at a desired level.

21. The method of claim 17 wherein step (b) comprises the following steps:

(c) removing the device from contact with the housing;

(d) re-contacting the housing with the device; and, (e) reapplying a pressure on the device in order to again nick the housing to thereby permanently re-alter alignment between the light source and the light conductor.

22. The method of claim 21 wherein step (b) comprises the further following step:

(f) repeating steps (c) through (e) until a desired alignment is achieved between the light conductor and the light source.

23. An apparatus comprising:

light supplying means for supplying light;

light receiving means for receiving light from the light supplying means; and, coupling means for coupling the light supplying means and the light receiving means in an alignment so that the light receiving means receives light from the light supplying means, wherein an axis which extends through the light supplying means and the light receiving means, wherein the coupling means is substantially symmetrical about the axis in two orthogonal planes containing the axis, and wherein the coupling means has a localized plastic deformation so as to align the light supplying means and the light receiving means.

24. The apparatus of claim 23 wherein the localized plastic deformation is a nick placed in the coupling means during deformation thereof.

* * * * *